Feb. 8, 1938. E. BUGATTI 2,107,689
POWER TRANSMITTING MECHANISM FOR VEHICLES
AND ESPECIALLY RAILROAD VEHICLES
Filed Oct. 9, 1935 3 Sheets-Sheet 3

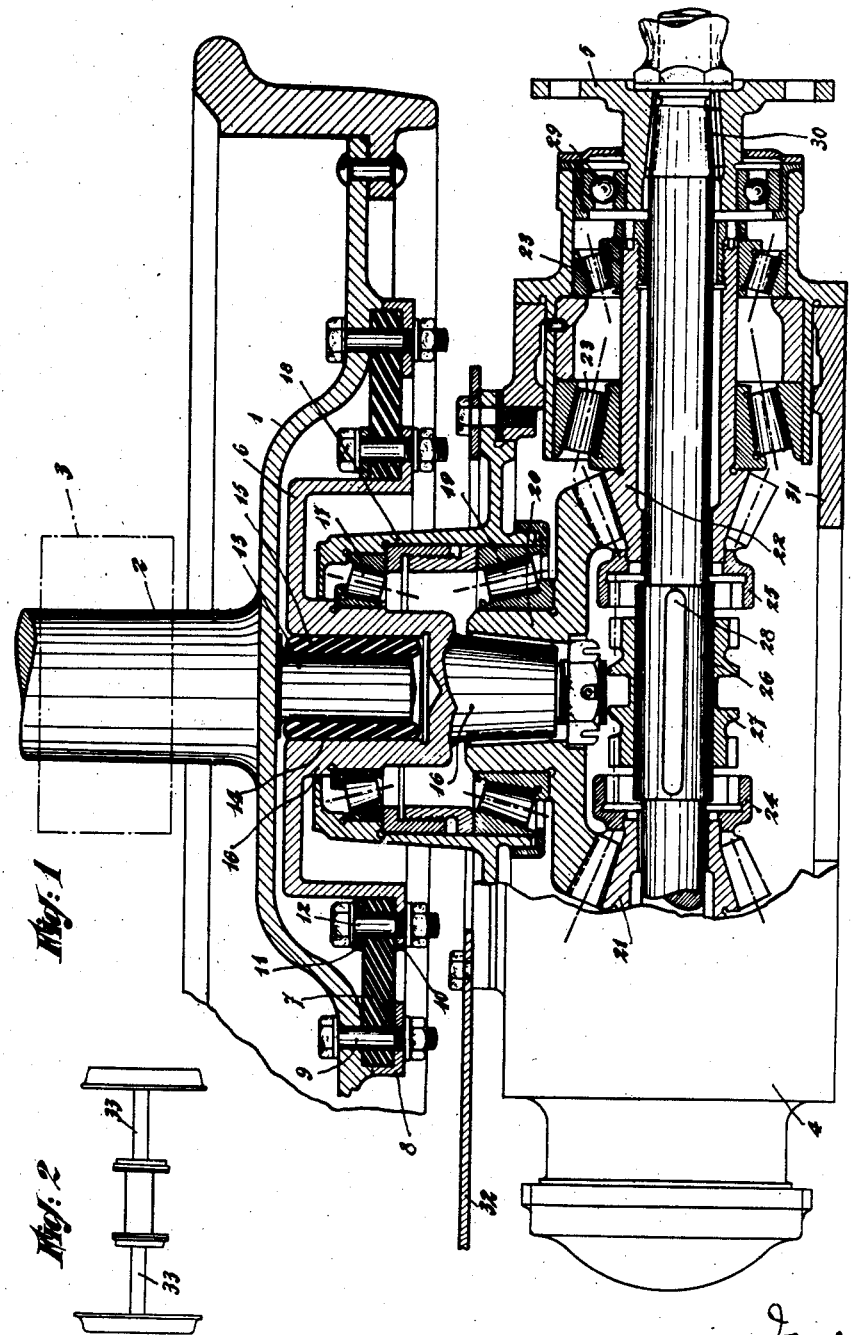

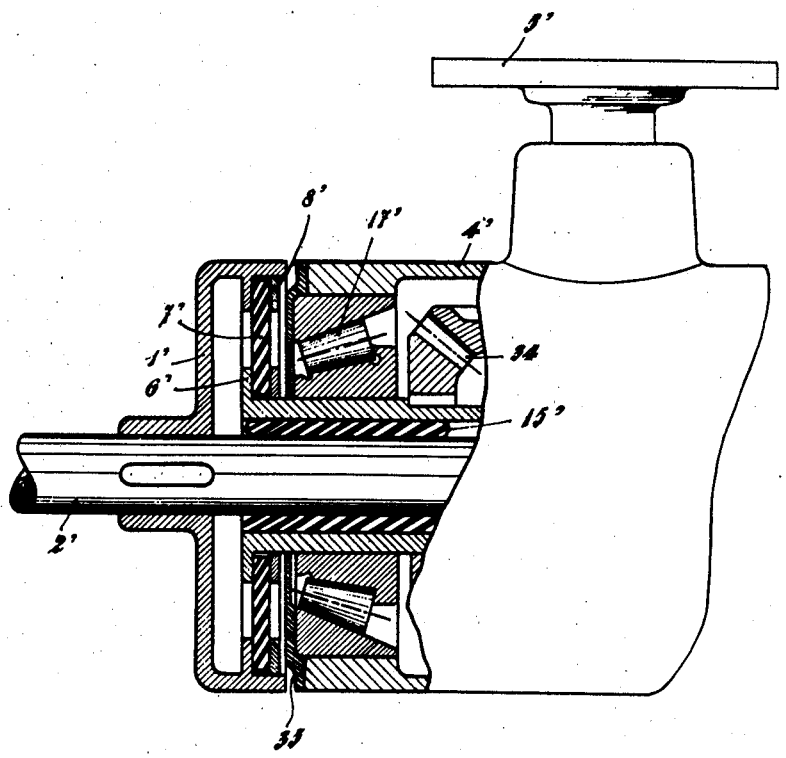

Inventor:
Ettore Bugatti
By Mauro + Lewis
Attorney

UNITED STATES PATENT OFFICE 2,107,689

POWER TRANSMITTING MECHANISM FOR VEHICLES AND ESPECIALLY RAILROAD VEHICLES

Ettore Bugatti, Molsheim, France

Application October 9, 1935, Serial No. 44,294
In France October 22, 1934

7 Claims. (Cl. 105—131)

The present invention relates to power transmitting mechanisms for use in connection with vehicle driving wheels and more especially to driving wheels of railway vehicles.

From the stress imposed by the rails to the wheels of railway vehicles there results the production of efforts and shocks exerted upon the wheels, especially in the vertical direction and in the transverse direction, with reference to the track. It follows that the wheels are subjected to vibrations and tremor and also to a periodic hammering resulting from their passage upon the rail joints. When, between the tread of the wheel and the body of said wheel there are interposed elastic organs such as pneumatic cushions or solid elastic fittings, the vibrations, tremor, etc., transmitted to the body of the wheel are not eliminated but are merely attenuated the more so as, due to the limitations due to the height of the guiding flange, the elasticity of the intermediate organs must necessarily be limited. Besides, the use of elastic intermediate organs has been adopted in the railroad industry only for light vehicles of the type of automobile vehicles.

It will therefore be understood that the parts located close to the driving wheels and which ensure the transmission of the driving power to said wheels are subjected to an excessive fatigue under the effect of these vibrations, tremor, etc. This fact is fully substantiated by experience. When it is desired to make use of ball or roller bearings for railway vehicle wheels, it is necessary, for the same reasons, to choose bearings of very large size. In this case, the linear velocities along the annular parts surrounding the balls or rollers become excessive.

The same drawbacks are experienced with road vehicles, in which, however, the quality of the pneumatic suspension can be more easily improved.

The object of the present invention is to provide a transmission mechanism which obviates the drawbacks above mentioned and is applicable in all cases in which vibrations, tremor, etc. imparted to the tread must not be transmitted beyond the driven organ, that is to say must not exert any action upon the drive.

The essential feature of this power transmitting mechanism lies in the fact that the wheel, or an element capable of actuating said wheel, is connected to its driving organ or organs, for instance to a driving plate or ring, through an elastic coupling. Preferably, the elasticity is supplied by a thick annular element or a plurality of annular elements, made of rubber or a similar material, said element or elements being fixed on one edge to the driving organ and on the other edge to the wheel, said element or elements being disposed in a plane substantially at right angles to the axis of the axle, in order that vibrations, tremor, etc. may be absorbed in all directions.

In a preferred embodiment of the invention, the device includes a power receiver comprising a driving plate and mounted with a certain play with respect to the wheel owing to the connection between this plate and the web of the wheel merely through an elastic annular member arranged as above explained, the casing or frame of said receiver device being connected to the vehicle through a hinged strut. Owing to this arrangement, the receiver device can follow the displacements of relatively large amplitude of the wheel, but the small movements, vibrations, etc. are not transmitted as far as the receiver device. Besides, as a rule, this receiver device has a relatively considerable mass, which is difficult to displace, and the period of oscillation of said mass is relatively long, so that, for this reason, combined with its elastic mounting, it is unable to follow the small displacements of the wheel tire, which are rapid and generally irregular.

This receiver may, in particular, be a mechanical receiver to which a torque is transmitted through a driving shaft and which transmits said torque to the plate through internal gears which may be those of a change speed device, or more simply those of a reversing gear. A receiver device of this kind may include a main shaft having its own bearings and actuating gears also provided with their own bearings, some of these gears consisting eventually of annular wheels which surround the shaft without touching it. With such an arrangement, not only is the space occupied by the whole greatly reduced, but also interreactions of the shaft and of the gears are avoided.

In an embodiment of the invention, the plate through which the drive is transmitted to the wheel is provided in its central part with a housing intended to receive, with the interposition of an elastic sleeve, a spindle carried by the wheel, which completes the elastic coupling between the driving organ and the driven organ.

Such an arrangement has the further advantage of increasing the safety since it prevents the dropping of the receiver device and all the consequences of such an accident in the case of the main elastic connection being broken.

In the case of railroad vehicles, according to an arrangement already suggested, the receiver device is disposed on the outside of the wheel, so that the transmission, and especially the internal organs of the receiver device, which is closed by a removable lid, are readily accessible.

Other features of the present invention will result from the detailed description of specific embodiments thereof.

Preferred embodiments of the present invention will be hereinafter described, with reference to the accompanying drawings, given merely by way of example, and in which:

Fig. 1 is an elevational view, partly in section, of a railroad vehicle wheel, with its driving mechanism according to the invention, said mechanism being adapted to act as a reversing gear;

Fig. 2 diagrammatically shows, on a reduced scale, another embodiment in which the mechanical transmission according to the invention is connected to the middle part of a railroad vehicle axle;

Fig. 3 shows the detail of the arrangement of Fig. 2;

Figure 4:
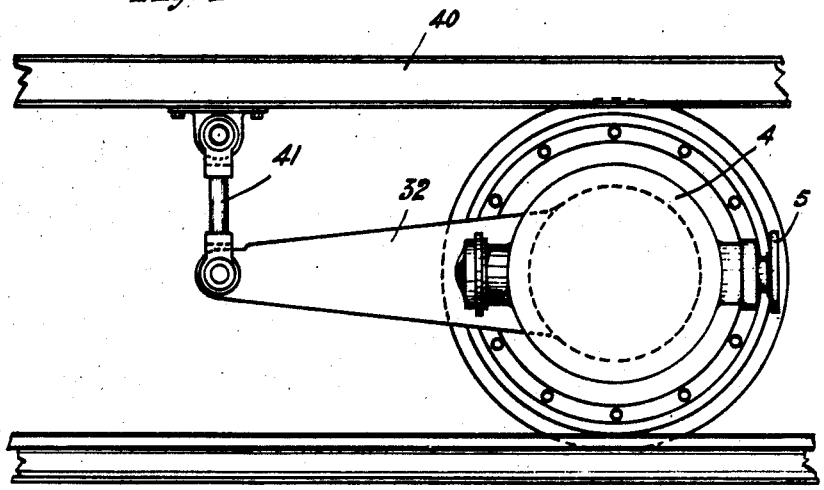
Fig. 4 is a diagrammatic side view showing at a smaller scale the mechanism according to Fig. 1, with the jointed strut interposed between said mechanism and the vehicle frame.

In the example hereinafter described, it has been supposed that the motive power is supplied to the receiver through a transmission shaft. It will be readily understood that the receiver might quite as well as an electrical, hydraulic, pneumatic, or any other receiver.

The wheel that is shown in Fig. 1 may be an elastic wheel of a known type, but for the sake of simplicity, I have shown in the drawings a rigid wheel. The web 1 of said wheel is fixed in any suitable manner to the axle 2, which is journalled, in a known manner, in boxes one of which is shown, in a diagrammatic manner, at 3, in dotted lines. This wheel is a driving wheel which is driven from a receiver the casing or envelope of which is designated, in a general manner, by reference character 4, and which is itself driven through a transmission shaft, not shown in the drawings, this shaft being fixed to plate 5.

The plate or disc through which the movement from the receiver is transmitted to the wheel is shown at 6. It is connected to the web of the wheel through a ring-shaped rubber piece 7 of suitable thickness. Of course, instead of a single ring-shaped rubber piece I might use several such pieces and this piece, or pieces, might be divided into a plurality of distinct segments. Ring-shaped member 7 has its outer peripheral edge held between web 1 and a ring 8 by means of bolts 9. In a like manner, the inner edge of member 7 is fixed to plate 6, being held between a flange 10 of this plate and a ring 11 by means of bolts 12.

In the embodiment shown by the drawings, the connection between plate 6 and the wheel is completed in the following manner:

Axle 2 or web 1 carries, in coaxial relation with its axis of revolution, a projection 13 which is engaged in a recess 14 of plate 6 and, in the space between projection 13 and the inner wall of said recess, I provide an elastic member, consisting for instance of a sleeve 15.

Plate 6 carries a central boss 16 (in which, as a matter of fact, recess 14 is partly provided) and this boss is journalled in a roller bearing 17 carried by the tubular portion of the casing 4 of the receiver. This tubular portion 18 supports, through another roller bearing 19, a bevel gear 20, which is connected to boss 16 in any suitable manner, for instance through ribs or feathers. Toothed gear 20 meshes with two identical pinions 21 and 22. Each of these pinions, pinion 22 for instance, is supported by suitable bearings, to wit roller bearings 23 in the case of the embodiment shown by the drawings. Pinions 21 and 22 are rigid, respectively, with pinions 24 and 25, either of which can be coupled with a shaft 26 through a sliding gear 27 provided with teeth at both ends. Shaft 26, with which the sliding gear is angularly coupled through a key 28, so as to be able to slide thereon, extends through pinions 21 and 22 and it is provided with bearings such as 29, which, in the example shown by the drawings acts as a bearing for both this shaft 26 and the plate 5 to which the motive power is transmitted, as above described. This plate 5 is angularly coupled to shaft 26 through any suitable means, for instance ribs 30.

Casing 4 is closed, on the outer side, that is to say on the side opposite to that of the wheel, by means of a removable lid 31, which makes it possible to inspect the inner organs of receiver 4. In order to prevent the latter from turning under the influence of the motive power transmitted thereto, the casing thereof is connected, for instance to the chassis of the vehicle, through a suitably jointed strut which comprises, in the embodiment of Fig. 4, a longitudinal member 32 and a pendular lever 41 linked to the vehicle frame 40.

Figure 5:
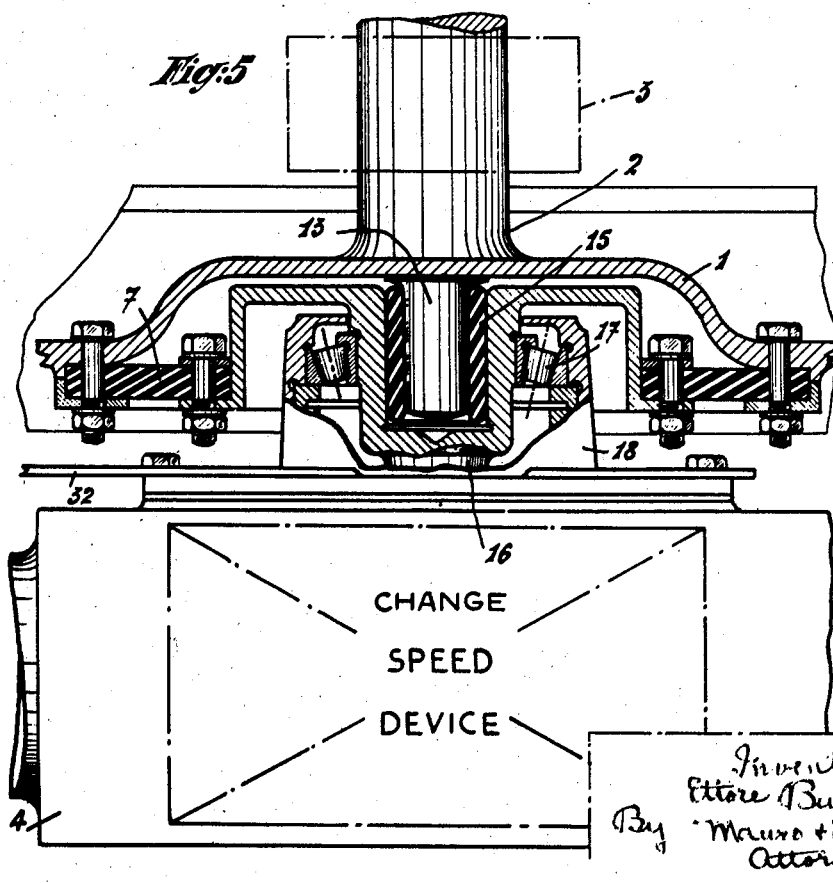
Fig. 5 is a diagrammatic view analogous to Fig. 1, but showing the use of a change speed device.

It results clearly from the above description that the receiver might include not only a reversing gear but also a change speed device (Fig. 5), which might be devised in the same manner as the gear boxes usually employed in automobile vehicles, by taking advantage of the feature above mentioned according to which the gears can be slipped around the main shaft, which reduces the space occupied by the whole device and eliminates reactions. In a like manner, the receiver might, in a modification, or as a supplementary feature, include a clutch, for instance a hydraulic clutch.

Of course, the drive mechanism just above described can be applied as well to wheels capable of revolving individually about stub axles as to wheels coupled to a revolving axle according to the usual practice in railroad vehicles.

As shown by Fig. 2, the mechanism above described can be utilized for driving an axle 33. In this case, the chief organs of the receiver may be arranged as shown by Fig. 3 in which the parts corresponding to above described parts of the embodiment of Fig. 1 are designated by the same reference numbers, but with an accent.

In this figure, gear 34 corresponds to gear 20 of Fig. 1 and it has been supposed to be fixed directly to the equivalent of plate 6, which, in this case is a ring-shaped member 6'. The gears or other organs of the receiver are, in this case, housed inside casing 4'. The mechanism may of course include two elastic ring-shaped pieces 7', one on each side of the casing 4'. A certain play must exist between this casing and the part 1' carried by the axle. Casing 4' may be hermetically closed by an annular member 36 preventing the dust, water, etc. from entering the casing, or through any other suitable means.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a vehicle, the combination of a wheel disk having a dished center part and a substantially planar peripheral part; a projection provided on the dished part of the wheel, coaxial therewith; a rotary driving member for said wheel, having a central bore adapted to accommodate said projection; an elastic sleeve fitted between said projection and said bore; elastic material disposed in ring formation between said rotary driving member and the peripheral part of said wheel, substantially co-planar with said part; means for coupling the driving member with the elastic material along one edge of the latter; means for coupling the peripheral part of the wheel with the elastic material along the other edge thereof, whereby the driving member is coupled to the wheel solely through elastic elements; and means for rotating said driving member.

2. In a vehicle, the combination of a wheel axle; at least one bearing on said axle for transmitting thereto the load of the vehicle; a wheel on said axle, disposed outside said bearing with reference to the vehicle; a power transmitting device disposed outside said wheel with reference to the vehicle, having a power input member and a rotary power output member; elastic means for coupling said rotary power output member with said wheel in substantially coaxial relation therewith, said elastic means being secured positively and detachably both to the rotary power output member and to the wheel, and providing the sole direct connection between the wheel and the rotary power output member; and means for driving said power input member.

3. The combination of claim 2, the power transmitting device comprising a casing adapted to enclose the power input member and the power output member, the latter having a part protruding out of the inner side of said casing for connection with the elastic means; a removable lid adapted for closing the casing on the outer side thereof.

4. A power transmission mechanism for a vehicle, and especially a railroad vehicle, including a wheel system, which comprises, in combination, a motive power receiver including a member for driving said wheel system, elastic coupling means between said member of the receiver and said wheel system, said receiver being supported merely by its coupling with the wheel system, the wheel system and the receiver being provided one with a recess disposed coaxially with the wheel system and the other with a projection engaged in said recess, a sleeve of elastic material interposed between said projection and the inner wall of said recess, so as to complete the elastic coupling means and act as a safety in case of breaking of said coupling means, and jointed reaction means, interposed between said receiver and the vehicle, for preventing relative angular displacements of said receiver under the influence of the motive power transmitted through it.

5. A power transmission mechanism for a vehicle, and especially a railroad vehicle, including a wheel system, which comprises, in combination, a motive power receiver including a member for driving said wheel system, elastic coupling means between said member of the receiver and said wheel system, said receiver being supported merely by its coupling with the wheel system, said receiver being disposed on the outside of the wheel and further including a casing provided with a lid so that the members of said receiver can be inspected, and jointed reaction means interposed between said receiver and the vehicle, for preventing relative angular displacements of said receiver under the influence of the motive power transmitted through it.

6. A power transmission mechanism for a vehicle, and especially a railroad vehicle, including a wheel system, which comprises, in combination, a motive power receiver including a casing, a power input shaft, means for supporting said shaft from said casing, at least one annular gear disposed about said shaft with clearance between them, means for rotatably supporting said annular gear from said casing, means for operatively coupling the annular gear with the power input shaft, a member for driving said wheel system, means for coupling the annular gear with the last named member, and elastic coupling means between said last named member and said wheel system, for driving the latter from said last named member, said receiver being supported merely by its coupling with the wheel system, and jointed reaction means, interposed between said receiver and the vehicle, adapted solely for preventing relative angular displacements of said receiver under the influence of the motive power transmitted through it.

7. In a vehicle the combination of an axle; a wheel disk at an end of said axle having a tire supporting, substantially planar peripheral part, and a relatively offset center part, so as to have a central recess located outwardly with respect to the axle; a floating control member adapted to revolve in substantially coaxial relation with reference to the axle, located partly in the wheel disk central recess; a flat ring of elastic material, substantially coplanar with the wheel disk peripheral part, interposed between the latter and the floating control member; means for attaching the ring to said peripheral part; means for attaching the ring to the floating control member; and means for revolving the floating control member.

ETTORE BUGATTI.